United States Patent
Dutra et al.

(10) Patent No.: US 10,110,025 B2
(45) Date of Patent: Oct. 23, 2018

(54) ENHANCED PARALLEL PROTECTION CIRCUIT

(71) Applicant: MICROSOFT TECHNOLOGY LICENSING, LLC, Redmond, WA (US)

(72) Inventors: Jonathan Alan Dutra, Saratoga, CA (US); Scott Francis Fullam, Palo Alto, CA (US); Agustya Ruchir Mehta, Mountain View, CA (US); Junius Mark Penny, Ben Lomond, CA (US); David Lukofsky, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 15/007,171

(22) Filed: Jan. 26, 2016

(65) Prior Publication Data
US 2017/0214239 A1 Jul. 27, 2017

(51) Int. Cl.
*H02J 7/00* (2006.01)

(52) U.S. Cl.
CPC .......... *H02J 7/0026* (2013.01); *H02J 7/0031* (2013.01)

(58) Field of Classification Search
CPC ...... H02J 7/0026; H02J 7/0029–7/0031; H02J 2007/0037–2007/004; H02H 7/18
See application file for complete search history.

(56) References Cited

U.S. PATENT DOCUMENTS 6,051,955 A * 4/2000 Saeki .................... H02J 7/0024
 320/120
6,492,791 B1 12/2002 Saeki et al.
(Continued)

FOREIGN PATENT DOCUMENTS

CN 201364940 Y 12/2009
CN 104578239 A 4/2015
WO WO2013/055026 A1 4/2013

OTHER PUBLICATIONS

"International Search Report and Written Opinion Issued in PCT Application No. PCT/US2017/013622", dated Apr. 6, 2017, 12 Pages.

(Continued)

*Primary Examiner* — Ronald W Leja
*Assistant Examiner* — Christopher Clark
(74) *Attorney, Agent, or Firm* — Scott Y. Shigeta; Newport IP, LLC

(57) ABSTRACT

An enhanced parallel protection circuit is provided. A system using separate battery packs in a parallel configuration is arranged with multiple protection circuit modules (PCMs). The PCMs are configured to detect fault conditions, such as over voltage, under voltage, excess current, excess heat, etc. Individual PCMs can be configured to control associated switches and/or other components. When a fault condition is detected by an individual PCM, the individual PCM triggers one or more associated switches to shut down one or more components. In addition, by the use of the techniques disclosed herein, the individual PCM can also trigger switches that are controlled by other PCMs. Configurations disclosed herein mitigate occurrences where a multi-PCM device is operating after at least one PCM has shut down. Configurations disclosed herein provide safeguards and redundant protection in scenarios where a fault event is detected by one PCM and not detected by another PCM in a parallel configuration.

24 Claims, 8 Drawing Sheets

(56) References Cited

U.S. PATENT DOCUMENTS

| | | | | |
|---|---|---|---|---|
| 6,577,105 B1* | 6/2003 | Iwaizono | | H01M 2/348 |
| | | | | 320/134 |
| 7,068,012 B1* | 6/2006 | Geren | | H01M 2/348 |
| | | | | 320/134 |
| 7,692,405 B2* | 4/2010 | Kim | | H01M 10/425 |
| | | | | 320/134 |
| 7,960,861 B2 | 6/2011 | Gscheidle et al. | | |
| 8,896,364 B2 | 11/2014 | Hafner et al. | | |
| 9,136,713 B1 | 9/2015 | Cheng et al. | | |
| 9,768,625 B2* | 9/2017 | Sakakibara | | H02J 7/0019 |
| 2009/0112496 A1* | 4/2009 | Suzuki | | H02J 7/0022 |
| | | | | 702/63 |
| 2009/0184682 A1* | 7/2009 | Kosugi | | H01M 2/1016 |
| | | | | 320/134 |
| 2009/0206841 A1 | 8/2009 | Weng | | |
| 2009/0257164 A1* | 10/2009 | Ikeuchi | | G01K 7/01 |
| | | | | 361/91.5 |
| 2010/0196747 A1* | 8/2010 | Takeda | | H01M 10/486 |
| | | | | 429/61 |
| 2010/0207582 A1 | 8/2010 | Wu et al. | | |
| 2011/0123842 A1 | 5/2011 | Kim | | |
| 2012/0032646 A1* | 2/2012 | Lee | | H02J 7/0031 |
| | | | | 320/135 |
| 2012/0300396 A1 | 11/2012 | Bang et al. | | |
| 2013/0141828 A1 | 6/2013 | Yamaguchi et al. | | |
| 2013/0224529 A1 | 8/2013 | Lee et al. | | |
| 2014/0295222 A1 | 10/2014 | Wang et al. | | |
| 2015/0200551 A1* | 7/2015 | Wu | | H02J 7/0014 |
| | | | | 320/103 |
| 2016/0006278 A1* | 1/2016 | Sakakibara | | H02J 7/0019 |
| | | | | 320/112 |
| 2016/0093921 A1* | 3/2016 | Kadirvel | | H01M 10/48 |
| | | | | 320/112 |
| 2016/0214851 A1* | 7/2016 | Bonelli | | B67D 7/08 |
| 2016/0380447 A1* | 12/2016 | Kadirvel | | H02J 7/0026 |
| | | | | 320/112 |
| 2017/0125999 A1* | 5/2017 | Yamamoto | | H02H 7/18 |
| 2017/0324257 A1* | 11/2017 | Adaniya | | H02J 7/0026 |

OTHER PUBLICATIONS

Lin, et al., "Battery Management System with Dual-Balancing Mechanism for LifePO4 battery Module," In Proceedings of IEEE Region 10 Conference, Nov. 21, 2011, 5 pages.

* cited by examiner

ENHANCED PARALLEL PROTECTION CIRCUIT

BACKGROUND

Many developments have been made to improve the way batteries are used in mobile devices. For instance, some circuits provide safety features in case a battery is exposed to high levels of current. Although there have been some improvements, there are many shortcomings and inefficiencies when it comes to some current technologies. For example, some current battery protection schemes offer limited features when it comes to redundancy protection. Such designs can lead to the loss of the ability to protect a battery string, which is likely to lead to serious consequences, ranging from the unwanted discharge, overcharging, leakage or even fire.

The disclosure made herein is presented with respect to these and other considerations. It is with respect to these and other considerations that the disclosure made herein is presented.

SUMMARY

An enhanced parallel protection circuit is provided and described herein. In some configurations, a system can include separate battery packs in a parallel configuration with multiple protection circuit modules (PCMs). The PCMs are configured to detect fault conditions, such as over voltage, under voltage, excess current, etc. The PCMs are configured to detect other types of fault conditions based on a temperature of a device and/or component. The PCMs can be configured to control associated switches and/or other components. When a fault condition is detected by an individual PCM, the individual PCM triggers one or more switches to shut down one or more components. In addition, by the use of the techniques disclosed herein, the individual PCM can also trigger switches that are controlled by other PCMs. Configurations disclosed herein mitigate occurrences where a multi-PCM device is operating after at least one PCM has shut down one or more components. Configurations disclosed herein provide safeguards and redundant protection in scenarios where a fault event is detected by one PCM and not detected by another PCM in a parallel configuration.

In one illustrative example, a multi-PCM system using multiple battery packs in a parallel configuration is arranged with sensors in communication with each PCM configured to detect fault conditions. When a fault condition is detected by either PCM, the system mutually triggers components controlling electrical paths to both batteries. Such configurations ensure that the device operation does not continue operation even when both PCMs do not immediately detect the fault condition.

It should be appreciated that the above-described subject matter may also be implemented as part of an apparatus, system, or as part of an article of manufacture. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims. For example, some examples illustrate a system having two batteries but it can be understood that the techniques described herein can be applied to systems will more than two batteries and more than two PCMs.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a wattage, current, voltage, or data signal. The terms, "gate," "drain," and "source," can also mean a "base," "collector" and "emitter," and/or equivalent parts.

An enhanced parallel protection circuit is provided and described herein. In some configurations, a system using separate battery packs in a parallel configuration is arranged with multiple PCMs. The PCMs are configured to detect fault conditions, such as over voltage, under voltage, excess current, etc. The PCMs are configured to detect other types of fault conditions based on a temperature of a device and/or component. Individual PCMs can be configured to control associated switches and/or other components. When a fault condition is detected by an individual PCM, the individual PCM triggers one or more associated switches to shut down one or more components. In addition, by the use of the techniques disclosed herein, the individual PCM can also trigger switches that are controlled by other PCMs. Configurations disclosed herein mitigate occurrences where a multi-PCM device is operating after at least one PCM has shut down.

Figure 1:
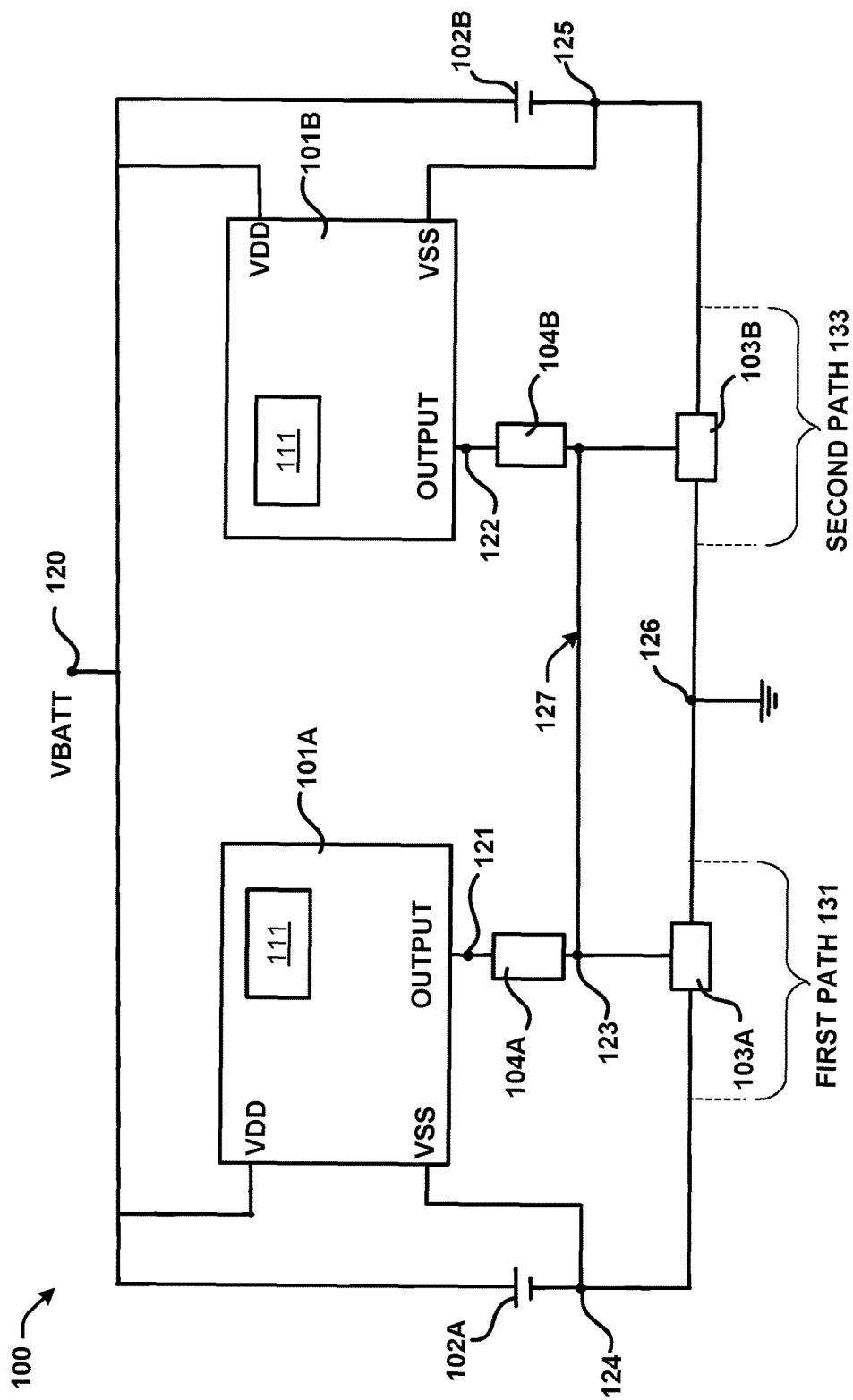
FIG. 1 shows a schematic diagram of an enhanced parallel protection circuit.

FIG. 1 shows a schematic diagram of a parallel protection circuit 100, also referred to herein as "the circuit 100." As shown, the circuit 100 includes a first PCM 101A and a second PCM 101B, both of which can be individually and generically referred to herein as a "PCM 101." In addition, the circuit 100 can include a first battery 102A and a second battery 102B, both of which can be individually and generically referred to herein as a "battery 102." It can be appreciated that this example circuit 100 is provided for illustrative purposes and is not to be construed as limiting. Techniques, system and apparatuses disclosed herein can be applied to any circuit 100 having two or more PCMs 101 and any number of batteries 102.

In some configurations, an individual PCM 101 includes one or more inputs and at least one output. The PCMs 101 are configured to transition to a fault state when a value of a signal at the one or more inputs exceeds one or more thresholds. For example, an individual PCM 101 can have a sensor 111 to detect a voltage and/or current with respect to a first input (VDD) and/or a second input (VSS). Any suitable threshold or combination of suitable thresholds can be used with the techniques disclosed herein. For example, a threshold for preventing a voltage and/or current that is capable of damaging at least one battery 102 or any other component can be used with the techniques disclosed herein. The sensor can be configured with one or more components for detecting a temperature, level of humidity, air pressure or any other condition related to the circuit 100 or a component of the circuit 100.

When an individual PCM 101 transitions to a fault state, the PCM 101 activates one or more outputs to control one or more components. In this example, an output of the first PCM 101A is coupled to a first node 121 and an output of the second PCM 101B is coupled to a second node 122. When the first PCM 101A transitions to a fault state, the first PCM 101A activates the output coupled to the first node 121. Similarly, when the second PCM 101B transitions to a fault state, the second PCM 101B activates the output coupled to the second node 122.

In one illustrative example, an individual PCM 101 can have a normal operating state and at least one fault state. When in the normal operating state, the output of an individual PCM 101 can be at a high level, e.g., greater than 2 volts, and when in a fault state an output can be at a low level, e.g., 0 volts or less than a volt. This example is provided for illustrative purposes and is not to be construed as limiting, it can be appreciated that an individual PCM 101 can produce any suitable voltage level for either state. For illustrative purposes, an "activated" output can include a transition from a high level to a low level. Alternatively, to accommodate the configuration of connected components and a desired result, an "activated" output can include a transition from a low level to a high level.

The circuit 100 can also include one or more components that are controlled by the PCMs 101. For example, the circuit 100 can include one or more switches that control paths of connectivity between two or more components, a component and a ground node, a component and a power source node, or a component and another device. In one illustrative example, the circuit 100 can include a first switch 103A and a second switch 103B ("switches 103"). The circuit 100 can also include components 104A, 104B and 127 for coupling the output nodes 121 and 122 to the switches 103.

In this example, the first switch 103A comprises an input coupled to the first node 121 by at least one component 104A. The first switch 103A can be configured to create a low impedance path or a closed circuit for a first path 131 when the first switch 103A is "on." The first switch 103A can also be configured to create a high impedance path or an open circuit for the first path 131 when the first switch 103A is "off." In this example, the first path 131 couples an anode of the first battery 102A to a ground node 126.

The second switch 103B comprises an input coupled to the second node 122 by at least one component 104B. The second switch 103B can be configured to create a low impedance path or a closed circuit for a second path 133 when the second switch 103B is "on." The second switch 103B can be configured to create a high impedance path or an open circuit for the second path 133 when the second switch 103B is "off." In this example, the second path 133 couples an anode of the second battery 102B to the ground node 126.

In some configurations, the first node 122 and the second node 123 are coupled by the one or more components 104A, 104B, and 127. The one or more components 104A, 104B and 127 can be configured to cause the first switch 103A and the second switch 103B to be "off" when the output of the first PCM 101A is low, and cause the first switch 103A and the second switch 103B to be "on" when the output of the first PCM 101A is at a high level.

The one or more components 104B can also be configured to cause the first switch 103A and the second switch 103B to be "off" when the output of the second PCM 101B is low, and cause the first switch 103A and the second switch 103B to be "on" when the output of the second PCM 101B is at a high level. In addition, the one or more components 104B can also be configured to cause the first switch 103A and the second switch 103B to be "off" when both the output of the first protection circuit 101A and the output of the second protection circuit 101B are at a low level.

Thus, when both PCMs 101 are in an operating state, both outputs are at a high level thus causing the first switch first switch 103A and the second switch 103B to be "on." In response to detecting a fault condition, the first protection circuit 101A transitions to a fault state and activates an output, e.g., transitions the output to a low level. The one or more components 104A, 104B, and 127 are configured to turn the first switch 103A and the second switch 103B "off" in response to the activation of the output of the first PCM 101A. Similarly, in response to detecting a fault condition, the second protection circuit 101B activates an output, e.g., transitions the output to a low level. The one or more components 104A, 104B, and 127 are configured to turn the first switch 103A and the second switch 103B "off" in response to the activation of the output of the second PCM 101B.

The configuration of the switches disclosed herein are provided for illustrative purposes and are not to be construed as limiting, it can be appreciated that other levels can cause a switch to be "on" or "off" depending on a desired result. For instance, in some alternative configurations, the switches 103 can be "on" when the output of at least one PCM 101 is at a low level, and configured to be "off" when the output of at least one PCM 101 is at a high level.

In some configurations, the one or more components 104A, 104B, and 127 are configured to enable the first PCM 101A to turn the first switch 103A and the second switch 103B "off" without conflicting with a signal of the output of the second PCM 101B. In addition, the one or more components 104A, 104B, and 127 are configured to enable the second PCM 101B to turn the first switch 103A and the second switch 103B "off" without conflicting with a signal of the output of the first PCM 101A.

Figure 2:
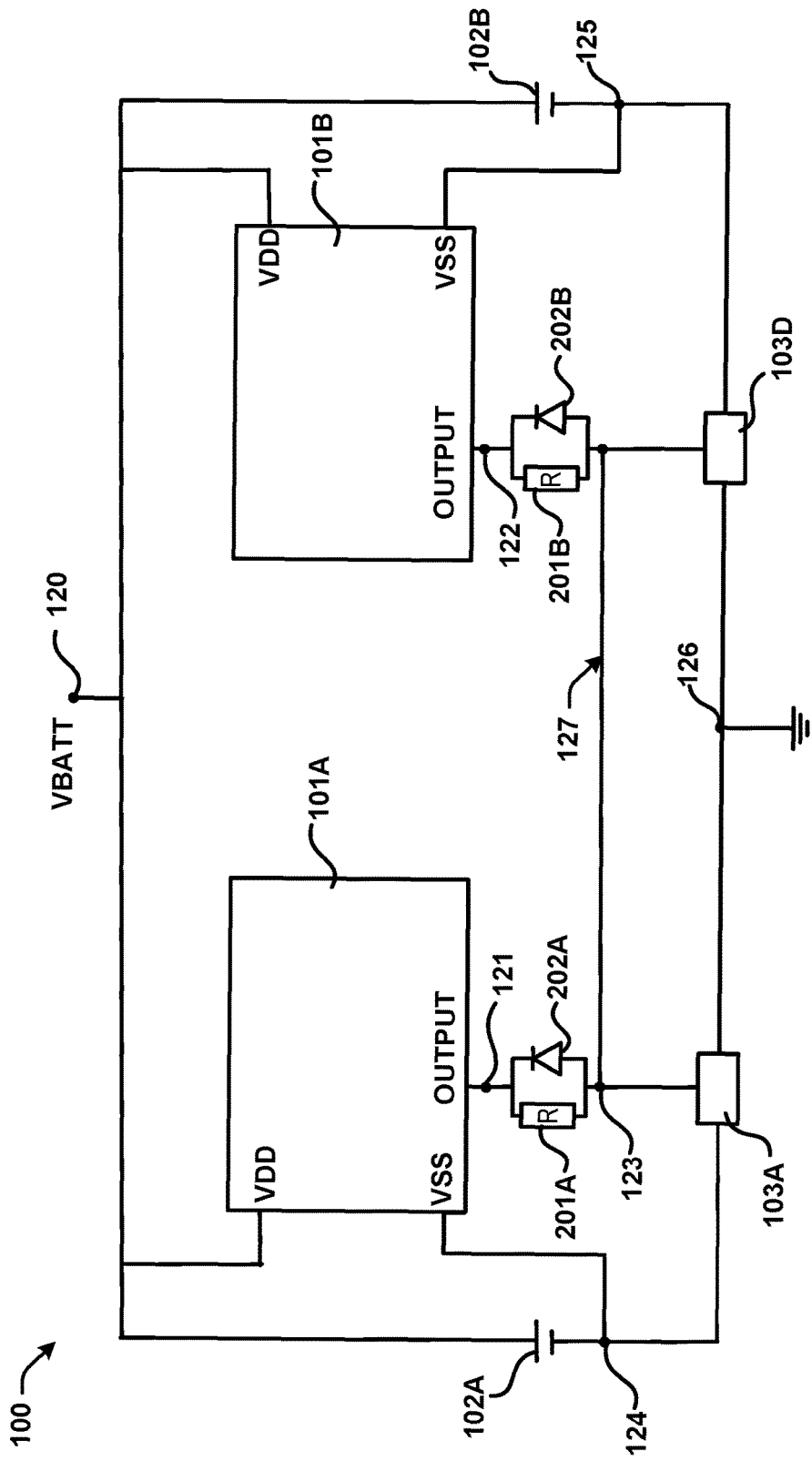
FIG. 2 shows a schematic diagram of an enhanced parallel protection circuit illustrating details of the components for coupling the output of a first protection circuit and the output of a second protection circuit.

Referring now to FIG. 2, aspects of the components 104A, 104B, and 127 for coupling the output of a first protection circuit 101A and the output of the second protection circuit 101B are shown and described below. In some configurations, the circuit 100 comprises a first diode 201A, a second diode 201B, a first resistor 202A, a second resistor 202B, and a conductor 127. In one illustrative example, a cathode of the first diode 201A is coupled to the first node 121 and an anode of the first diode 201A is coupled to the input of the first switch 103A. The first resistor 202A is arranged in parallel with the first diode.

Also, in this example, a cathode of the second diode 201B is coupled to the second node 122 and an anode of the second diode 201B is coupled to the input of the second switch 103D. The second resistor 202B is arranged in parallel with the second diode 201B. The input of the first switch 103A and the input of the second switch 103B are coupled by a conductor 127. It can be appreciated that other components and/or arrangements can be used to achieved the techniques described herein.

Figure 3:
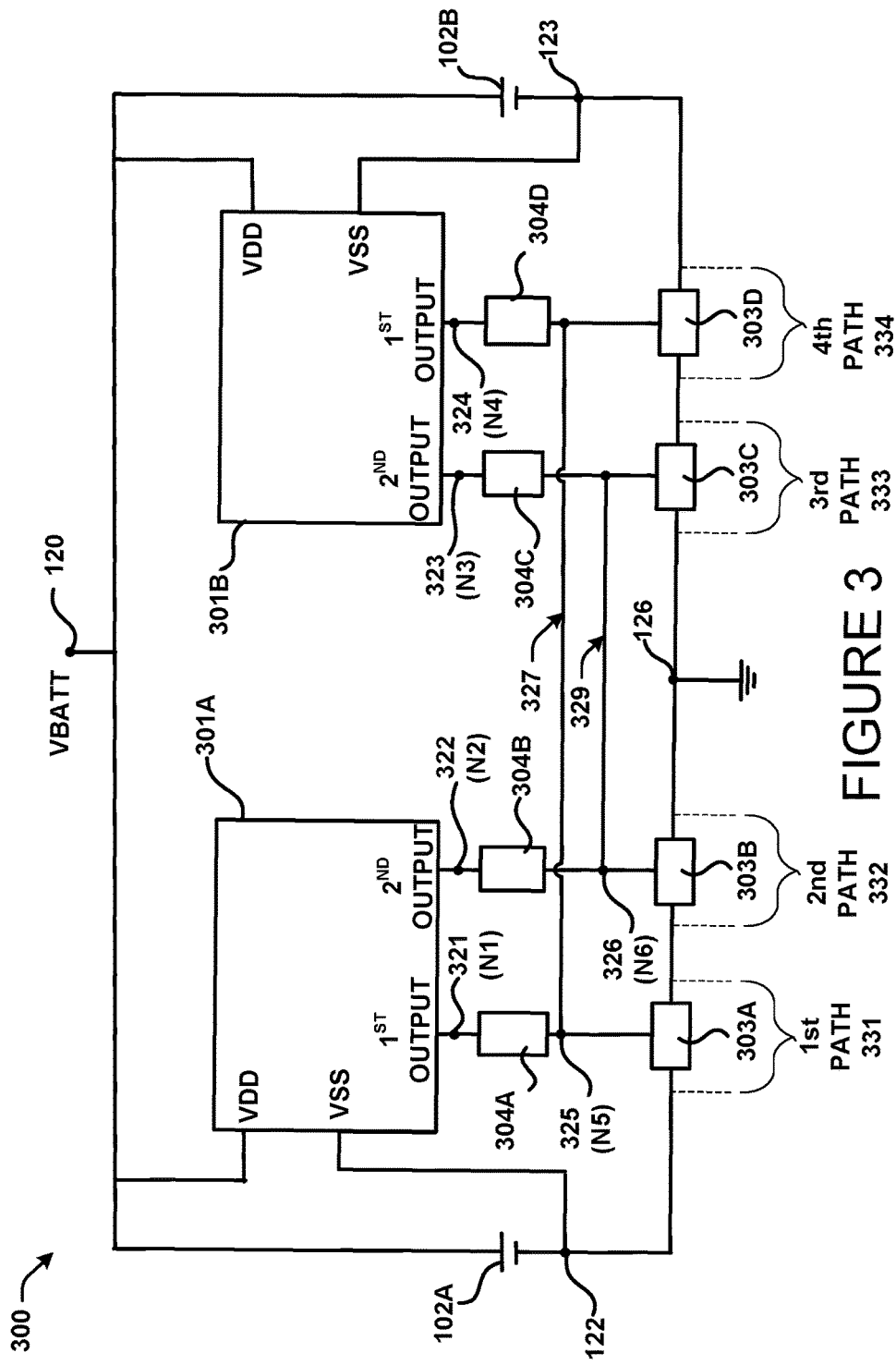
FIG. 3 shows a schematic diagram of an enhanced parallel protection circuit where individual protection circuits include multiple outputs that are coupled in accordance with the configurations disclosed herein.

Referring now to FIG. 3, a schematic diagram of an enhanced parallel protection circuit 300 ("circuit 300") having individual protection circuits modules with multiple outputs are shown and described below. As shown, the circuit 300 includes a first PCM 301A and a second PCM 301B. In addition, the circuit 300 can include a first battery 102A and a second battery 102B. It can be appreciated that this example circuit 300 is provided for illustrative purposes and is not to be construed as limiting. Techniques, systems and apparatuses disclosed herein can be applied to any circuit having two or more PCMs 301 and any number of batteries 102.

The first PCM 301A comprises one or more inputs (VDD and VSS), a first output coupled to a first node 321, a second output coupled to a second node 322. The first PCM 301A is configured to transition to a first fault state and activate the first output when one or more values of at least one signal at the one or more inputs (VDD and/or VSS) of the first PCM 301A meet or exceed a first set of criteria. In addition, the first PCM 301A is configured to transition to a second fault state and activate the second output coupled to the second node 322 when the one or more values of the at least one signal at the one or more inputs of the first PCM 301A meet or exceed a second set of criteria.

The second PCM 301B comprises one or more inputs (VDD and VSS), a first output coupled to a fourth node 324, and a second output coupled to a third node 323. The second PCM 301B is configured to transition to a first fault state and activate the output coupled to the third node 323 when one or more values of at least one signal at the one or more inputs (VDD and/or VSS) of the second PCM 301B meet or exceed the first set of criteria. The second PCM 301B is configured to transition to the second fault state and activate the output coupled to the fourth node 324 when the one or more values of the at least one signal at the one or more inputs of the second PCM meet or exceed the second set of criteria. As summarized above, any suitable set of criteria can be used for either fault state, including criteria that is needed to protect a component of the circuit 300 or any device or component connected to the circuit 300. In one illustrative example, the first and second output of the modules 301 can be a charge pump output (DSG) and a first charge pump (CHG).

The circuit 300 can also include one or more components that are controlled by the PCMs 101. For example, the circuit 300 can include one or more switches that couple the batteries 102 to a ground node, a power source node, or another component. The circuit 300 can also include one or more switches that couple other components to a ground node, a power source node, or another component. In one illustrative example, the circuit 300 can include a first switch 303A, a second switch 303B, a third switch 303C, and a fourth switch 303D (switches "303"). The circuit 300 can also include components 304A-304D for coupling the output nodes 321-324 to the switches 303.

In this example, the first switch 303A comprises an input coupled to the first node 321 by at least one component 304A. The first switch 303A can be configured to create a low impedance path or a closed circuit for a first path 331 when the first switch 303A is "on." The first switch 303A can also be configured to create a high impedance path or an open circuit for the first path 331 when the first switch 303A is "off" In this example, the first path 331 couples an anode of the first battery 102A to the second switch 303B. The one or more components 304A can be configured to cause the first switch 303A to be "off" when the first output of the first PCM 301A is low, and cause the first switch 303A to be "on" when the first output of the first PCM 301A is at a high level.

The second switch 303B comprises an input coupled to the second node 322 by at least one component 304B. The second switch 103B can be configured to create a low impedance path or a closed circuit for a second path 332 when the second switch 303B is "on." The second switch 303B can be configured to create a high impedance path or an open circuit for the second path 332 when the second switch 303B is "off" In this example, the second path 332 can couple the first switch 303A to a ground node 126. The one or more components 304B can be configured to cause the second switch 303B to be "off" when the second output of the first PCM 301A is low, and cause the second switch 103B to be "on" when the second output of the first PCM 301A is at a high level. For illustrative purposes, the first switch 103A and the second switch 103B are associated with the first PCM 101A.

The third switch 303C comprises an input coupled to the third node 323 by at least one component 304C. The third switch 303C can be configured to create a low impedance path or a closed circuit for a third path 333 when the third switch 303C is "on." The third switch 303C can be configured to create a high impedance path or an open circuit for the third path 333 when the third switch 303C is "off." In this example, the third path 333 can couple the fourth switch 303D to the ground node 126. The one or more components 304C can be configured to cause the third switch 303C to be "off" when the second output of the second PCM 301B is low, and cause the third switch 303C to be "on" when the second output of the second PCM 301B is at a high level.

The fourth switch 303D comprises an input coupled to the fourth node 324 by at least one component 304D. The fourth switch 303D can be configured to create a low impedance path or a closed circuit for a fourth path 334 when the fourth switch 303D is on. The fourth switch 303D can be configured to create a high impedance path or an open circuit for the fourth path 334 when the fourth switch 303D is "off." In this example, the fourth path 334 can couple an anode of the second battery 102B to the third switch 303C. The one or more components 304D can be configured to cause the fourth switch 303D to be "off" when the first output of the second PCM 101B is low, and cause the fourth switch 303D to be "on" when the first output of the second PCM 301B is at a high level. For illustrative purposes, the first switch 103A and the second switch 103B are associated with the first PCM 101A.

In some configurations, the first node 321 and the fourth node 324 are coupled by the one or more components 304A, 304D, and 327 that cause the first switch 303A and the fourth switch 303D to be "off" when the first output of the first protection circuit 301A and/or the first output of the second protection circuit 301B are activated. For example, when both PCMs 301 are in an operating state, all outputs are at a high level thus causing the first switch 303A and the second switch 303B to be "on." In such an example, when the first PCM 301A meets a first set of criteria, the first protection circuit 301A transitions to a first fault state. In response to the transition to the first fault state, the first output of the first protection circuit 301A is activated, e.g., the first output transitions from a high level to a low level. The one or more components 304A, 304D, and 327 are configured to turn the first switch 303A and the fourth switch 303D "off" in response to the activation of the first output of the first PCM 301A.

In addition, when the second PCM 301B meets the first set of criteria, the second protection circuit 301B transitions to a first fault state. In response to the transition to the first fault state, the first output of the second protection circuit 301B is activated, e.g., the first output transitions from a high level to a low level. The one or more components 304A, 304D, and 327 are configured to turn the first switch 303A and the fourth switch 303D "off" in response to the activation of the first output of the second PCM 301B.

In some configurations, the one or more components 304A, 304D, and 327 are configured to enable the first PCM 301A to turn the first switch 303A and the fourth switch 303D "off" without conflicting with a signal of the first output of the second PCM 301B. In addition, the one or more components 304A, 304D, and 327 are configured to enable the second PCM 301B to turn the first switch 303A and the fourth switch 303D "off" without conflicting with a signal of the first output of the first PCM 301A.

In some configurations, the second node 322 and the third node 323 are coupled by the one or more components 304B, 304C and 329 that cause the second switch 303B and the third switch 303C to be "off" when either the second output of the first protection circuit 301A or the second output of the second protection circuit 301B are activated. For example, when both PCMs 301 are in an operating state, the outputs are at a high level thus causing the second switch 303B and the third switch 103C to be "on." In such an example, when the first PCM 301A meets a second set of criteria, the first protection circuit 301A transitions to a second fault state. In response to the transition to the second fault state, the second output of the first protection circuit 301A is activated, e.g., the second output transitions from a high level to a low level. The one or more components 304B, 304C and 329 are configured to turn the second switch 303B and the third switch 303C "off" in response to the activation of the second output of the first PCM 301A.

In addition, when the second PCM 301B meets the second set of criteria, the second protection circuit 301B transitions to a second fault state. In response to the transition to the second fault state, the second output of the second protection circuit 301B is activated, e.g., the second output transitions from a high level to a low level. The one or more components 304B, 304C and 329 are configured to turn the second switch 303B and the third switch 303C "off" in response to the activation of the second output of the second PCM 301B.

In some configurations, the one or more components 304B, 304C and 329 are configured to enable the second PCM 301B to turn the second switch 303B and the third switch 303C "off" without conflicting with a signal of the second output of the first PCM 301A. In addition, the one or more components 304B, 304C and 329 are configured to enable the second PCM 301B to turn the second switch 303B and the third switch 303C "off" without conflicting with a signal of the second output of the first PCM 301A.

Figure 4:
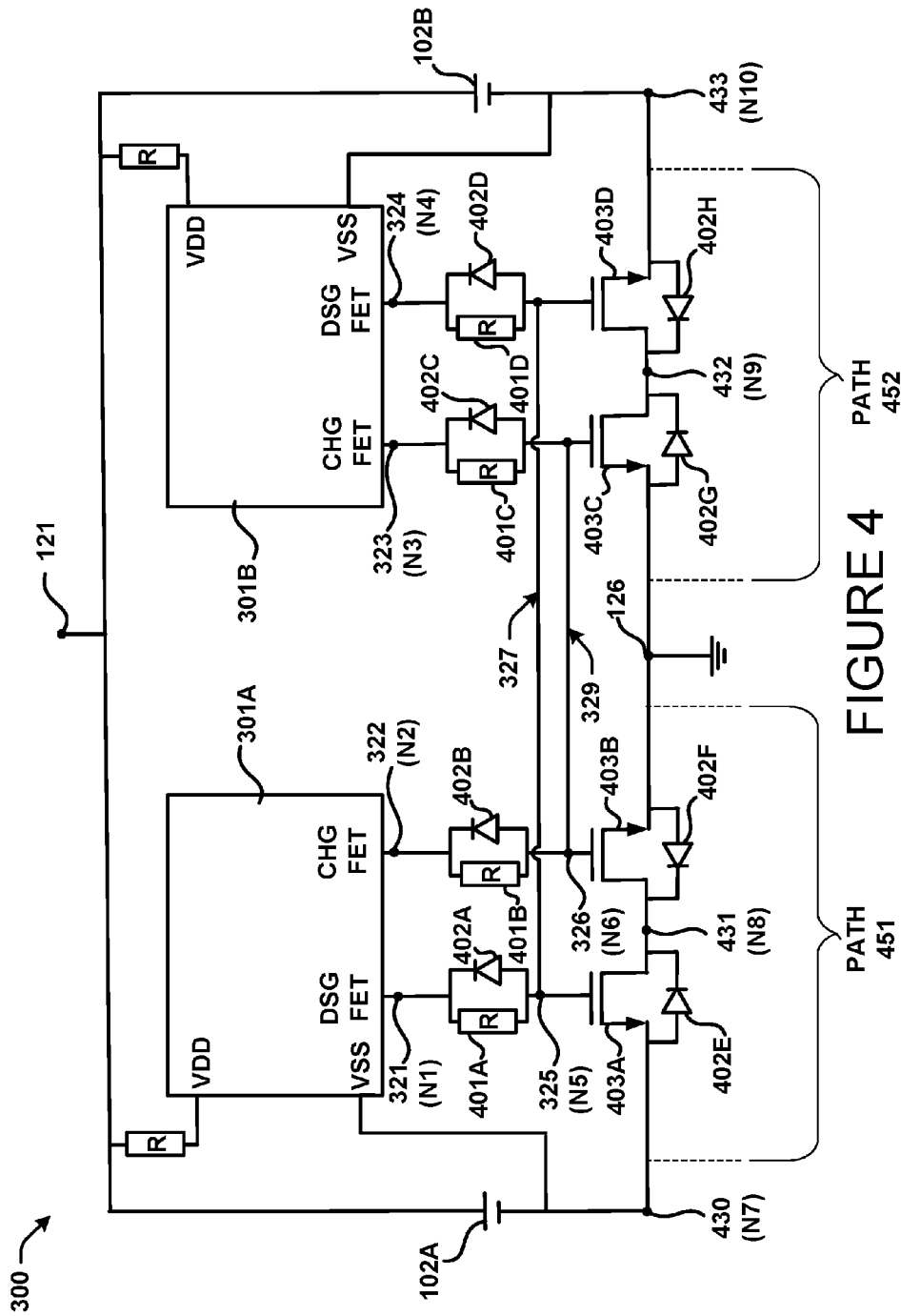
FIG. 4 shows a schematic diagram illustrating details of switches and components for coupling the output of the individual protection circuits.

Referring now to FIG. 4, aspects of the components 304A-304D, 327 and 329 for coupling the outputs of the first protection circuit 301A and the outputs of the second protection circuit 301B are shown and described below. In some configurations, the circuit 300 comprises a first resistor 401A, second resistor 401B, third resistor 401C, fourth resistor 401D, first diode 402A, second diode 402B, third diode 402C, fourth diode 402D, a first conductor 327, and a second conductor 329.

In one illustrative example, the cathode of the first diode 402A is coupled to the first node 321 and the anode of the first diode 402A is coupled to a fifth node 325. The first resistor 401A is arranged in parallel with the first diode 402A. Also, in this example, the cathode of the fourth diode 402D is coupled to the fourth node 324 and the anode of the fourth diode 402D is coupled to the fifth node 325. The fourth resistor 401D is arranged in parallel with the fourth diode 402D. The fifth node 325 can be formed by the first conductor 327.

The cathode of the second diode 402B is coupled to the second node 322 and the anode of the second diode 402B is coupled to a sixth node 326. The second resistor 401B is arranged in parallel with the second diode 402B. Also, in this example, the cathode of the third diode 402C is coupled to the third node 323 and the anode of the third diode 402C is coupled to the sixth node 326. The third resistor 401C is arranged in parallel with the third diode 402C. The sixth node 326 can be formed by the second conductor 329. It can be appreciated that other components and/or arrangements can be used to achieved the techniques described herein.

Also shown in FIG. 4, aspects of the switches 303 are shown and described below. In one illustrative example, the circuit 300 comprises a first transistor 403A, second transistor 403B, third transistor 403C, fourth transistor 403D, fifth diode 402E, sixth diode 402F, seventh diode 402G, and an eighth diode 402H.

In this example, a gate of the first transistor 403A is coupled to the fifth node 325 and the source of the first transistor 403A is coupled to the anode of the first battery 102A. The drain of the first transistor 403A is coupled to the drain of the second transistor 403B. The cathode of the fifth diode 402E is coupled to the drain of the first transistor 403A and the drain of the second transistor 403B. The anode of the fifth diode 402E is coupled to the source of the first transistor 403A and the anode of the first battery 102A. The gate of the second transistor 403B is coupled to the sixth node 326 and a source of the second transistor 403B is coupled to the ground node 126. The cathode of the sixth diode 402F is coupled to the drain of the first transistor 403A and the drain of the second transistor 403B. The anode of the sixth diode 402F is coupled to the source of the second transistor 403B and the ground node 126.

Also shown in FIG. 4, the gate of the third transistor 403C is coupled to the sixth node 326, and the drain of the third transistor 403C is coupled to the drain of the fourth transistor 403D. The source of the third transistor 403C is coupled to the ground node 126. The anode of the seventh diode 402G is coupled to the ground node 126 and the source of the third transistor 403C. The cathode of the seventh diode 402G is coupled to the drain of the third transistor 403C and the drain of the fourth transistor 403D.

In addition, in this example, the gate of the fourth transistor 403D is coupled to the fifth node 325. The source of the fourth transistor 403D is coupled to the anode of the second battery 102B. The anode of the eighth diode 402H is coupled to the source of the fourth transistor 403D and the anode of the second battery 102B. The cathode of the eighth diode 402H is coupled to the drain of the third transistor 403C and the drain of the fourth transistor 403D. It can be appreciated that other components and/or arrangements can be used to achieved the techniques described herein as these examples are provided for illustrative purposes.

The techniques disclosed herein enable a single PCM to control a resistance level within multiple paths, such as the paths 331-334 of FIG. 3 or the paths 451-452 of FIG. 4. In addition to controlling a level of resistance, a single PCM can also control the direction of current within multiple paths. In the example shown in FIG. 4, when the first PCM 301A and the second PCM 301B are in an operating state, current is free to flow in both directions in the two paths 451 and 452. When the first PCM 301A and/or the second PCM 301B transition to the first fault state, the current in two different paths 451 and 452 can be controlled to flow in a first direction. In addition, when the first PCM 301A and/or the second PCM 301B transition to the second fault state, the current in two different paths 451 and 452 can be controlled to flow in a second direction. In addition, with the first PCM 301A and/or the second PCM 301B transition to both the first fault state and the second fault state, the two different paths 451 and 452 can transition to a high level of resistance or an open circuit. It can be appreciated that resistance levels in other paths, such as a path between the seventh node 430 and the eighth node 431, a path between the eighth node 431 and the ground node 126, a path between the ground node 126 and the ninth node 432, and a path between the ninth node 432 and the tenth node 433, can be controlled by the techniques disclosed herein.

It can be appreciated that techniques disclosed herein can control the direction of current and/or a level of resistance for any path connecting or more nodes of a circuit. The examples are provided for illustrative purposes and are not to be construed as limiting. Although the aforementioned examples illustrate paths that couple a battery to a ground note, it can be appreciated that the paths having controlled levels and/or directions of resistance can couple components of a device, couple components to a ground node, couple components to a power source, or couple components to other devices. For illustrative purposes, FIG. 5, FIG. 6, and FIG. 7 illustrate other configurations where the techniques disclosed herein control multiple paths between a power source node (VBATT) and the cathode of multiple batteries.

Figure 5:
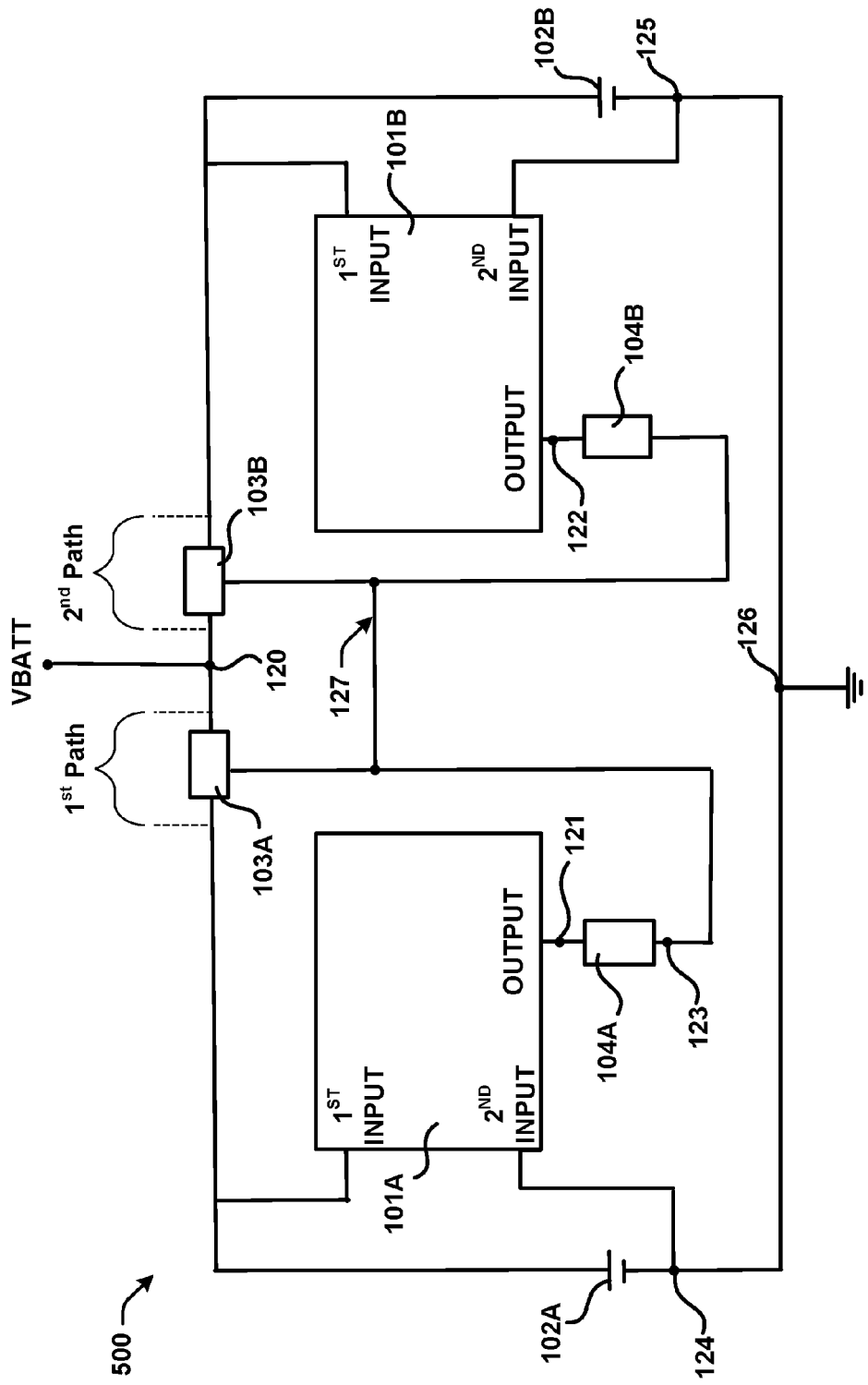
FIG. 5 shows a schematic diagram of an enhanced parallel protection circuit having switches controlling paths of connectivity between a power source node and multiple batteries.

FIG. 5 shows a schematic diagram of an enhanced parallel protection circuit 500 having switches controlling paths of connectivity between a power source node 101 and two batteries. Some components of FIG. 5 are configured in a manner similar to the circuit 100 shown in FIG. 1. However, in the example shown in FIG. 5, the first switch 103A is configured to control the connection between the cathode of the first battery 102A to the power source node 120 ("VDD"). In addition, the second switch 103B is configured to control the connection between the cathode of the second battery 102B to the power source node 120. The power source node 120 can be coupled to an external power source, e.g., a charger, and/or a load, e.g., a motherboard of a device.

Figure 6:
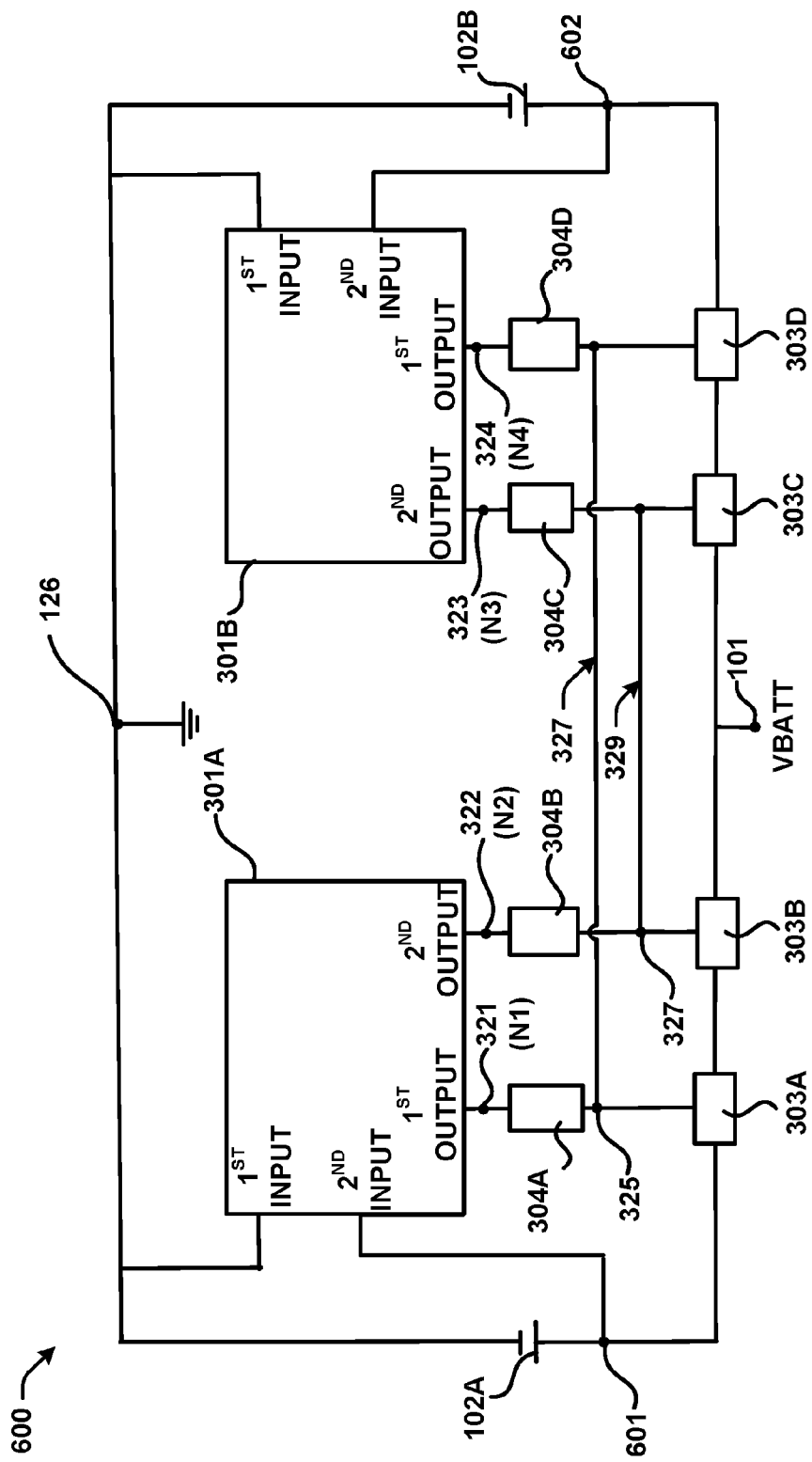
FIG. 6 shows a schematic diagram of another enhanced parallel protection circuit where individual protection circuits include multiple outputs that are coupled to switches controlling paths of connectivity between a power source node and multiple batteries.

FIG. 6 shows a schematic diagram of another enhanced parallel protection circuit 600 having switches configured to control the connection between a power source node 101 and two batteries. Some components of FIG. 6 are configured in a manner similar to the circuit 300 shown in FIG. 3. However, in the example shown in FIG. 6, the first switch 103A is configured to control the connection between the cathode of the first battery 102A to the power source node 120. In addition, the fourth switch 103D is configured to control the connection between the cathode of the second battery 102B to the power source node 120.

Figure 7:
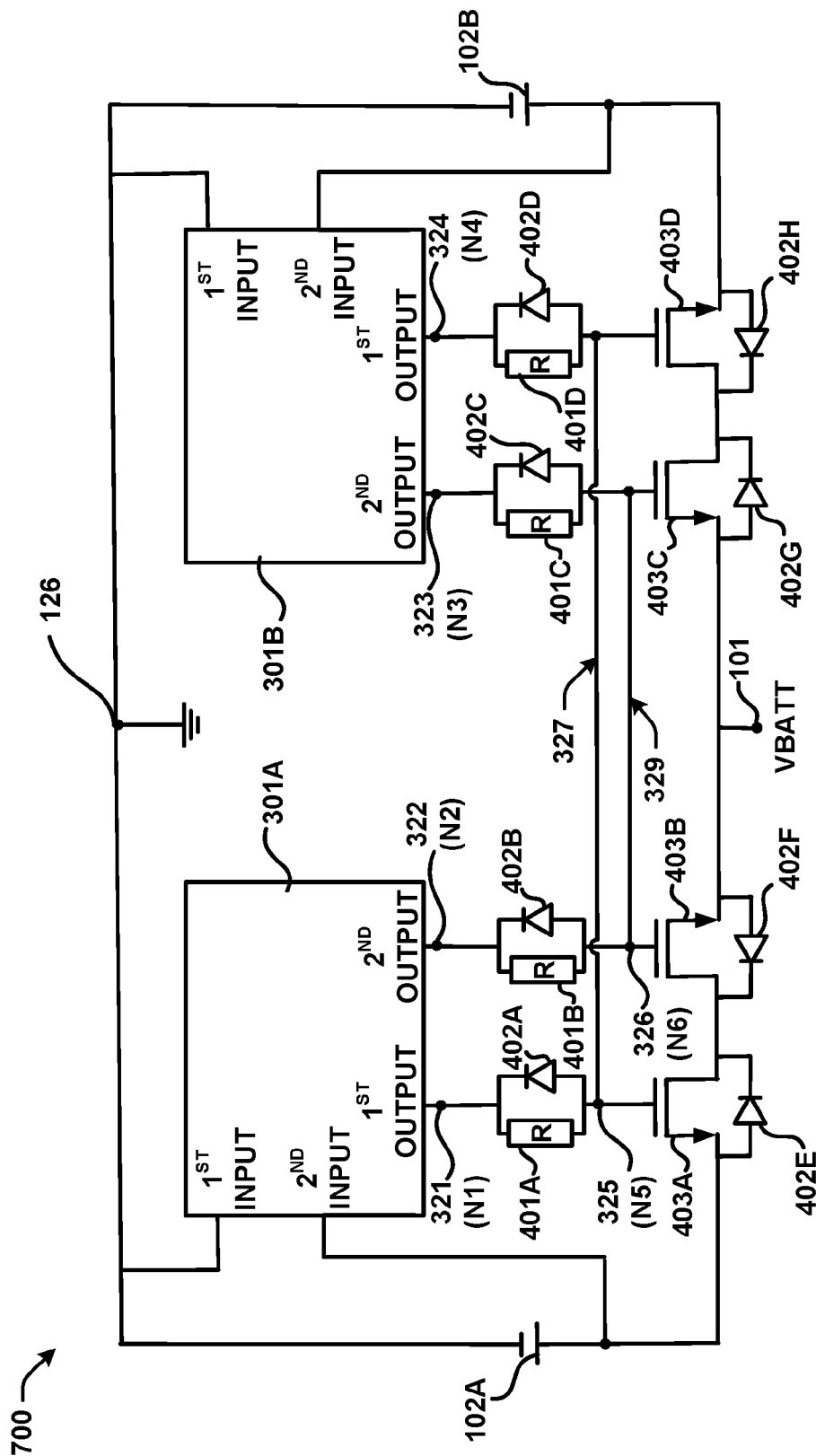
FIG. 7 shows a schematic diagram illustrating details of the components for coupling the output of the individual protection circuits and switches for controlling paths of connectivity between a power source node and multiple batteries.

FIG. 7 shows a schematic diagram illustrating details of the components for coupling the output of the individual protection circuits and switches for controlling paths of resistance between a power source node and two batteries. Some components of FIG. 7 are configured in a manner similar to the circuit 300 shown in FIG. 4. However, in the example shown in FIG. 7, the source of the first transistor 403A is coupled to the cathode of the first battery 102A. In addition, the anode of the fifth diode 402E is coupled to the source of the first transistor 403A and the cathode of the first battery 102A. The gate of the second transistor 403B is coupled to the sixth node 326 and a source of the second transistor 403B is coupled to the power source node 120. The anode of the sixth diode 402F is coupled to the source of the second transistor 403B and the power source node 120. The anode of the batteries 102 are coupled to the ground node 126.

Also shown in FIG. 7, the source of the third transistor 403C is coupled to the power source node 120. The anode of the seventh diode 402G is coupled to the power source node 120 and the source of the third transistor 403C. In addition, in this example, the source of the fourth transistor 403D is coupled to the cathode of the second battery 102B. The anode of the eighth diode 402H is coupled to the source of the fourth transistor 403D and the cathode of the second battery 102B.

Figure 8:
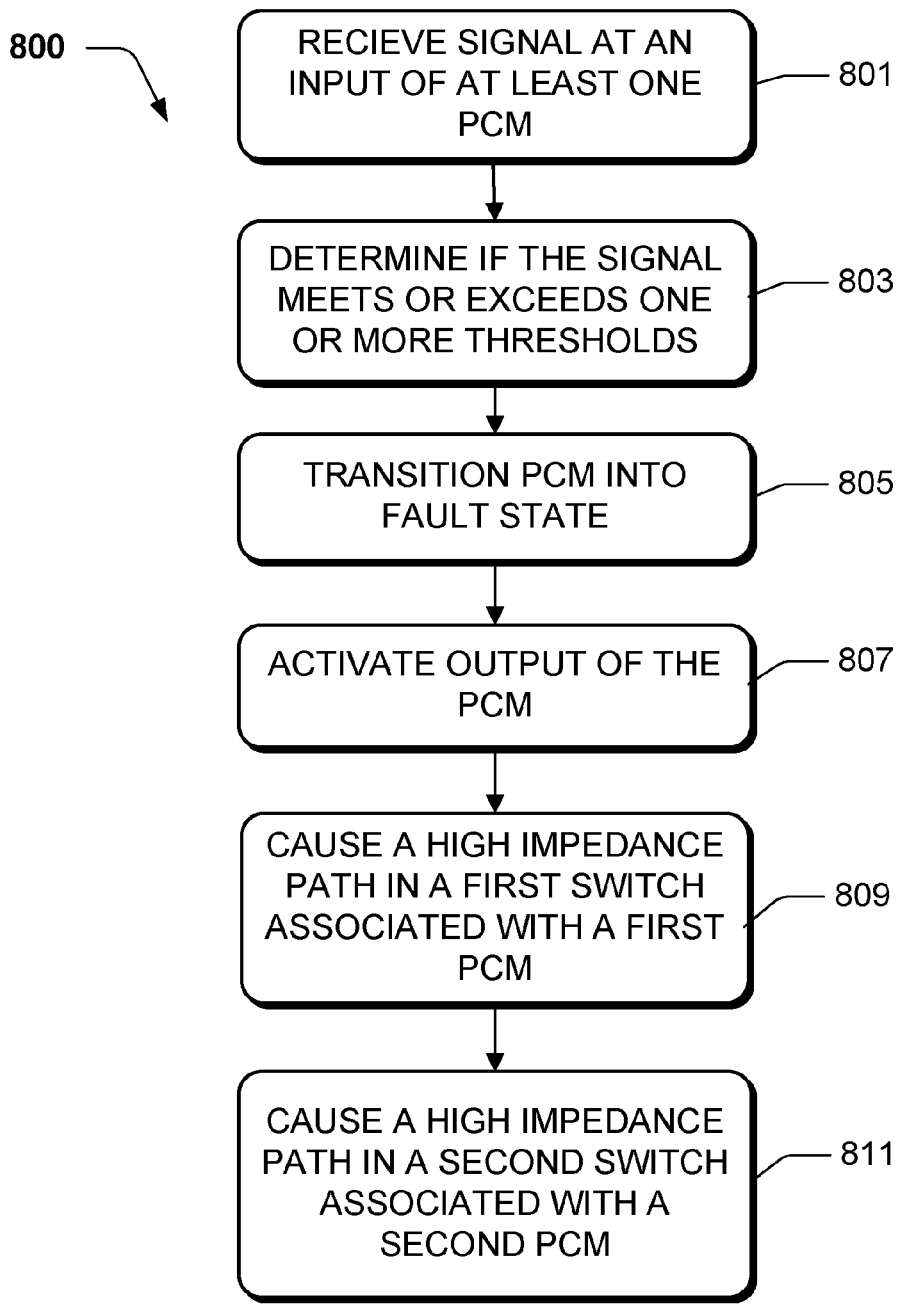
FIG. 8 illustrates a flow chart implementing an example method in accordance with techniques disclosed herein.

FIG. 8 illustrates a flow chart implementing an exemplary method 800 in accordance with techniques disclosed herein. Other logical flows can be implemented using the circuits described herein, the logical disclosed herein is provided for illustrative purposes and is not to be construed as limiting. The logical flow described herein can be implemented by a circuit having a first PCM and a second PCM. The circuit can also include a first switch associated with the first PCM, and a second switch associated with the second PCM.

The logical flow starts at block 801, where at least one PCM, of either the first PCM or the second PCM, receives a signal at an input of the PCM. Next, at block 803, the PCM determines if the signal exceeds one or more thresholds. As described herein, one or more thresholds can be configured to protect one or more components of a device from excessive current and/or voltage. Other thresholds can be configured to detect the presence of a low voltage and/or current. Next, at block 805, the PCM transitions to a fault state. Depending on the application, a PCM can have more than one fault state to accommodate a range of scenarios that can be detected. Next, at block 807, the PCM can activate an output. For example, if under an operating state, an output can be at a high voltage level. In response to transitioning to a fault state, an output can transition to a low voltage level. An activation of an output can also include a transition from a low voltage level to a high voltage level. Next, at blocks 809 and 811, one or more components respond to the activation of the output causing a high impedance path in a first switch associated with a first PCM, and causing a high impedance path in a second switch associated with a second PCM.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in its entirety.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus, comprising:
a first protection circuit module comprising one or more inputs and an output coupled to a first node, wherein the first protection circuit module is configured to activate the output coupled to the first node and transition to a fault state when a value of a signal at the one or more inputs of the first protection circuit module meets or exceeds one or more thresholds;
a second protection circuit module comprising one or more inputs and an output coupled to a second node, wherein the second protection circuit module is configured to activate the output coupled to the second node and transition to the fault state when a value of a signal at the one or more inputs of the second protection circuit module meets or exceeds one or more thresholds;
a first switch comprising an input coupled to the first node, wherein the first switch creates a low impedance path for a first path when the first switch is on, and wherein the first switch creates a high impedance path or an open circuit for the first path when the first switch is off; and
a second switch comprising an input coupled to the second node, wherein the second switch creates a low impedance path for a second path when the second switch is on, and wherein the second switch creates a high impedance path or an open circuit for the second path when the second switch is off, wherein the first node and the second node are coupled by one or more components to cause the first switch and the second switch to be off when either the output of the first protection circuit or the output of the second protection circuit are activated, wherein the one or more components coupling the first node and the second node comprise a first diode, a first resistor, a second diode, and a second resistor, wherein a cathode of the first diode is coupled to the first node and an anode of the first diode is coupled to the input of the first switch, wherein the first resistor is arranged in parallel with the first diode, wherein a cathode of the second diode is coupled to the second node and an anode of the second diode is coupled to the input of the second switch, wherein the second resistor is arranged in parallel with the second diode, and wherein the input of the first switch and the input of the second switch are coupled by a conductor.

2. The apparatus of claim 1, wherein the first switch is caused to be on when the first protection circuit module and the second protection circuit module are both in an operating state, and wherein the second switch is caused to be on when the first protection circuit module and the second protection circuit module are both in an operating state.

3. The apparatus of claim 1, wherein the one or more components are configured to enable the first protection circuit module to turn the first switch and the second switch off without conflicting with a signal of the output of the second protection circuit module.

4. The apparatus of claim 1, wherein the one or more components are configured to enable the second protection circuit module to turn the first switch and the second switch off without conflicting with a signal of the output of the first protection circuit module.

5. The apparatus of claim 1, wherein the first switch comprises a transistor, wherein the input of the first switch is a gate of the transistor and the first path passes through a source of the transistor and a drain of the transistor.

6. The apparatus of claim 5, wherein the transistor is a field-effect transistor or a metal oxide semiconductor field-effect transistor.

7. The apparatus of claim 1, wherein the second switch comprises a transistor, wherein the input of the second switch is a gate of the transistor and the second path passes through a source of the transistor and a drain of the transistor.

8. The apparatus of claim 7, wherein the transistor is a field-effect transistor or a metal oxide semiconductor field-effect transistor.

9. The apparatus of claim 1, wherein the one or more inputs of the first protection circuit module comprise a first input coupled to a cathode of a first battery and a second input coupled to an anode of the first battery, and wherein the one or more inputs of the second protection circuit module comprise a first input coupled to a cathode of a second battery and a second input coupled to an anode of the second battery, wherein the first path couples the anode of the first battery to a ground node, and wherein the second path couples the anode of the second battery to the ground node.

10. The apparatus of claim 1, wherein the one or more inputs of the first protection circuit module comprise a first input coupled to a cathode of a first battery and a second input coupled to an anode of the first battery, and wherein the one or more inputs of the second protection circuit module comprise a first input coupled to a cathode of a second battery and a second input coupled to an anode of the second battery, wherein the first path couples the cathode of the first battery to a power source node, and wherein the second path couples the cathode of the second battery and the power source node.

11. An apparatus, comprising:
a first protection circuit module comprising one or more inputs, an output coupled to a first node, an output coupled to a second node, wherein the first protection circuit module is configured to activate the output coupled to the first node and transition to a first fault state when one or more values of at least one signal at the one or more inputs of the first protection circuit module meets a first set of criteria, and wherein the first protection circuit module is configured to activate the output coupled to the second node and to transition to a second fault state when the one or more values of the at least one signal at the one or more inputs of the first protection circuit module meets a second set of criteria;
a second protection circuit module comprising one or more inputs, an output coupled to a third node, an output coupled to a fourth node, wherein the second protection circuit module is configured to activate the output coupled to the third node and to transition to a first fault state when one or more values of at least one signal at the one or more inputs of the second protection circuit module meets the first set of criteria, and wherein the second protection circuit module is configured to activate the output coupled to the fourth node and to transition to the second fault state when the one or more values of the at least one signal at the one or more inputs of the second protection circuit module meets the second set of criteria;
a first switch comprising an input coupled to the first node, wherein the first switch creates a low impedance path for a first path when the first switch is on, and wherein the first switch creates a high impedance path or an open circuit for the first path when the first switch is off;
a second switch comprising an input coupled to the second node, wherein the second switch creates a low impedance path for a second path when the second switch is on, and wherein the second switch creates a high impedance path or an open circuit for the second path when the second switch is off;
a third switch comprising an input coupled to the third node, wherein the third switch creates a low impedance path for a third path when the third switch is on, and wherein the third switch creates a high impedance path or an open circuit for the third path when the third switch is off, wherein the second node and the third node are coupled by one or more components to cause the second switch and the third switch to be off when either the output coupled to the second node or the output coupled to the third node are activated; and
a fourth switch comprising an input coupled to the fourth node, wherein the fourth switch creates a low impedance path for a fourth path when the fourth switch is on, and wherein the fourth switch creates a high impedance path or an open circuit for the fourth path when the fourth switch is off, wherein the first node and the fourth node are coupled by one or more components to cause the first switch and the fourth switch to be off when either the output coupled to the first node or the output coupled to the fourth node are activated, wherein the one or more components coupling the first node and the fourth node comprise a first diode, a first resistor, a second diode, and a second resistor, wherein a cathode of the first diode is coupled to the first node and an anode of the first diode is coupled to the input of the first switch, wherein the first resistor is arranged in parallel with the first diode, wherein a cathode of the second diode is coupled to the fourth node and an anode of the second diode is coupled to the input of the fourth switch, wherein the second resistor is arranged in parallel with the second diode, and wherein the input of the first switch and the input of the fourth switch are coupled by a conductor.

12. The apparatus of claim 11, wherein the first protection circuit module causes the first switch and the second switch to be on when the first protection circuit module is in an operating state, and wherein the second protection circuit module causes the third switch and the fourth switch to be on when the second protection circuit module is in an operating state.

13. The apparatus of claim 11, wherein the one or more components coupling the first node and the fourth node are configured to enable the first protection circuit module to turn the first switch and the fourth switch off without conflicting with a signal at the output coupled to the fourth node, and wherein the one or more components coupling the first node and the fourth node are configured to enable the second protection circuit module to turn the first switch and the fourth second switch off without conflicting with a signal at the output coupled to the first node.

14. The apparatus of claim 11, wherein the one or more components coupling the second node and the third node are configured to enable the first protection circuit module to turn the second switch and the third switch off without conflicting with a signal at the output coupled to the third node, and wherein the one or more components coupling the second node and the third node are configured to enable the second protection circuit module to turn the second switch and the third second switch off without conflicting with a signal at the output coupled to the second node.

15. The apparatus of claim 11, wherein the first switch comprises a first transistor, the second switch comprises a second transistor, the third switch comprises a third transistor, the fourth switch comprises a fourth transistor, the input of the first switch is a gate of the first transistor and the first path passes through a source of the first transistor and a drain of the first transistor, the input of the second switch is a gate of the second transistor and the second path passes through a source of the second transistor and a drain of the second transistor, the input of the third switch is a gate of the third transistor and the third path passes through a source of the third transistor and a drain of the third transistor, and the input of the fourth switch is a gate of the fourth transistor and the fourth path passes through a source of the fourth transistor and a drain of the fourth transistor.

16. The apparatus of claim 15, wherein the first switch further comprises a first diode, the second switch further comprises a second diode, the third switch further comprises a third diode, the fourth switch further comprises a fourth diode, an anode of the first diode coupled to the source of first transistor, a cathode of the first diode coupled to the drain of first transistor, an anode of the second diode coupled to the source of second transistor, a cathode of the second diode coupled to the drain of second transistor, an anode of the third diode coupled to the source of third transistor, a cathode of the third diode coupled to the drain of third transistor, an anode of the fourth diode coupled to the source of fourth transistor, a cathode of the fourth diode coupled to the drain of fourth transistor.

17. The apparatus of claim 16, wherein the drain of the first transistor is coupled to the drain of the second transistor, the drain of the third transistor is coupled to the drain of the fourth transistor.

18. The apparatus of claim 17, wherein the one or more inputs of the first protection circuit module comprise a first input coupled to a cathode of a first battery and a second input coupled to an anode of the first battery, and wherein the one or more inputs of the second protection circuit module comprise a first input coupled to a cathode of a second battery and a second input coupled to an anode of the second battery, the source of the first transistor is coupled to the anode of the first battery, the source of the fourth transistor is coupled to the anode of the second battery, the source of the second transistor is coupled to a ground node, and the source of the third transistor is coupled to the ground node.

19. The apparatus of claim 17, wherein the one or more inputs of the first protection circuit module comprise a first input coupled to a cathode of a first battery and a second input coupled to an anode of the first battery, and wherein the one or more inputs of the second protection circuit module comprise a first input coupled to a cathode of a second battery and a second input coupled to an anode of the second battery, the source of the first transistor is coupled to the cathode of the first battery, the source of the fourth transistor is coupled to the cathode of the second battery, the source of the second transistor is coupled to a power source node, and the source of the third transistor is coupled to the power source node.

20. An apparatus, comprising:
a first protection circuit module comprising one or more inputs, an output coupled to a first node, an output coupled to a second node, wherein the first protection circuit module is configured to activate the output coupled to the first node and transition to a first fault state when one or more values of at least one signal at the one or more inputs of the first protection circuit module meets a first set of criteria, and wherein the first protection circuit module is configured to activate the output coupled to the second node and to transition to a second fault state when the one or more values of the at least one signal at the one or more inputs of the first protection circuit module meets a second set of criteria;
a second protection circuit module comprising one or more inputs, an output coupled to a third node, an output coupled to a fourth node, wherein the second protection circuit module is configured to activate the output coupled to the third node and to transition to a first fault state when one or more values of at least one signal at the one or more inputs of the second protection circuit module meets the first set of criteria, and wherein the second protection circuit module is configured to activate the output coupled to the fourth node and to transition to the second fault state when the one or more values of the at least one signal at the one or more inputs of the second protection circuit module meets the second set of criteria;
a first switch comprising an input coupled to the first node, wherein the first switch creates a low impedance path for a first path when the first switch is on, and wherein the first switch creates a high impedance path or an open circuit for the first path when the first switch is off;
a second switch comprising an input coupled to the second node, wherein the second switch creates a low impedance path for a second path when the second switch is on, and wherein the second switch creates a high impedance path or an open circuit for the second path when the second switch is off;
a third switch comprising an input coupled to the third node, wherein the third switch creates a low impedance path for a third path when the third switch is on, and wherein the third switch creates a high impedance path or an open circuit for the third path when the third switch is off, wherein the second node and the third node are coupled by one or more components to cause the second switch and the third switch to be off when either the output coupled to the second node or the output coupled to the third node are activated; and
a fourth switch comprising an input coupled to the fourth node, wherein the fourth switch creates a low impedance path for a fourth path when the fourth switch is on, and wherein the fourth switch creates a high impedance path or an open circuit for the fourth path when the fourth switch is off, wherein the first node and the fourth node are coupled by one or more components to cause the first switch and the fourth switch to be off when either the output coupled to the first node or the output coupled to the fourth node are activated, wherein the one or more components coupling the second node and the third node comprise a first diode, a first resistor, a second diode, and a second resistor, wherein a cathode of the first diode is coupled to the second node and an anode of the first diode is coupled to the input of the second switch, wherein the first resistor is arranged in parallel with the first diode, wherein a cathode of the second diode is coupled to the third node and an anode of the second diode is coupled to the input of the third switch, wherein the second resistor is arranged in parallel with the second diode, and wherein the input of the second switch and the input of the third switch are coupled by a conductor.

21. The apparatus of claim 20, wherein the first protection circuit module causes the first switch and the second switch to be on when the first protection circuit module is in an operating state, and wherein the second protection circuit module causes the third switch and the fourth switch to be on when the second protection circuit module is in an operating state.

22. The apparatus of claim 20, wherein the one or more components coupling the first node and the fourth node are configured to enable the first protection circuit module to turn the first switch and the fourth switch off without conflicting with a signal at the output coupled to the fourth node, and wherein the one or more components coupling the first node and the fourth node are configured to enable the second protection circuit module to turn the first switch and the fourth second switch off without conflicting with a signal at the output coupled to the first node.

23. The apparatus of claim 20, wherein the one or more components coupling the second node and the third node are configured to enable the first protection circuit module to turn the second switch and the third switch off without conflicting with a signal at the output coupled to the third node, and wherein the one or more components coupling the second node and the third node are configured to enable the second protection circuit module to turn the second switch and the third second switch off without conflicting with a signal at the output coupled to the second node.

24. The apparatus of claim 20, wherein the first switch comprises a first transistor, the second switch comprises a second transistor, the third switch comprises a third transistor, the fourth switch comprises a fourth transistor, the input of the first switch is a gate of the first transistor and the first path passes through a source of the first transistor and a drain of the first transistor, the input of the second switch is a gate of the second transistor and the second path passes through a source of the second transistor and a drain of the second transistor, the input of the third switch is a gate of the third transistor and the third path passes through a source of the third transistor and a drain of the third transistor, and the input of the fourth switch is a gate of the fourth transistor and the fourth path passes through a source of the fourth transistor and a drain of the fourth transistor.

* * * * *